(No Model.)
H. C. LOTT.
GRAIN SEPARATOR.
No. 267,549. Fig. 1. Patented Nov. 14, 1882.
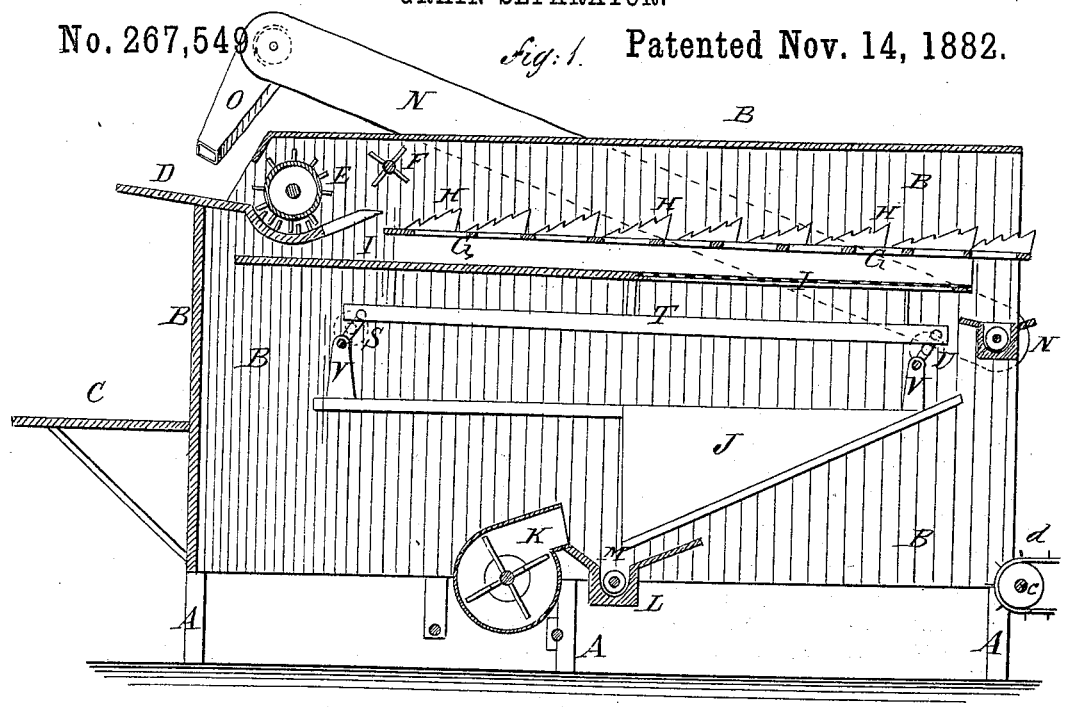
Fig. 2.
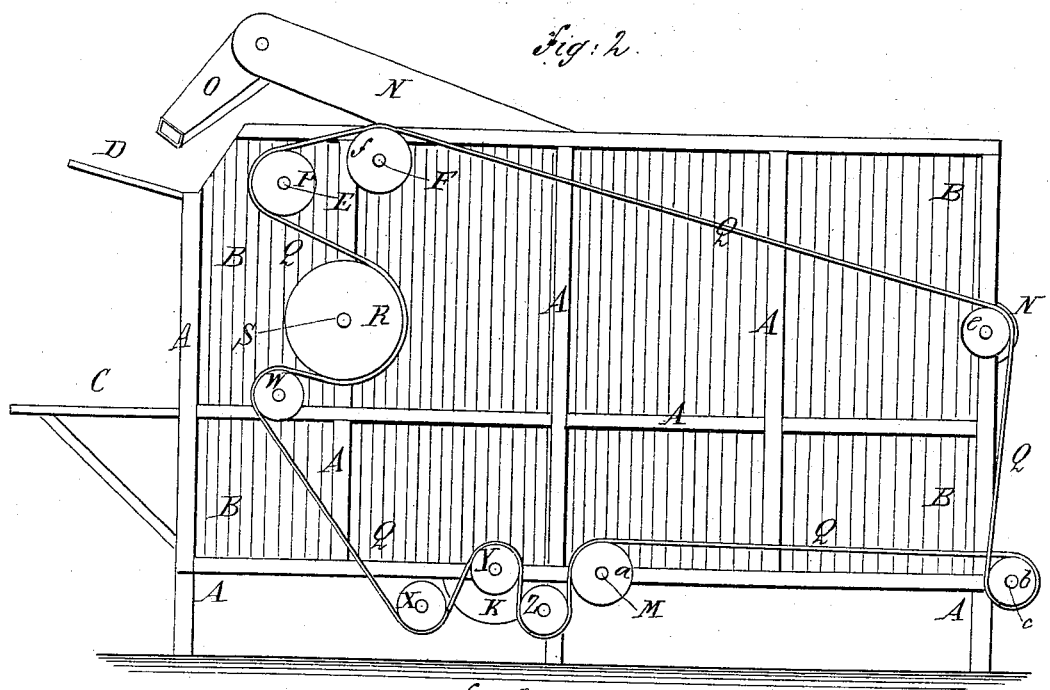
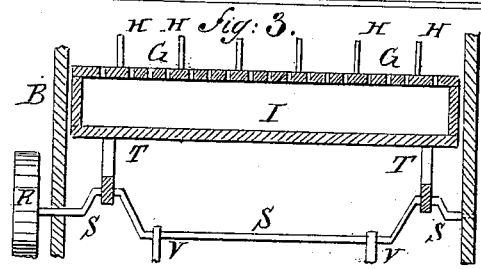
WITNESSES:
Chas. Nida
C. Sedgwick
INVENTOR:
H. C. Lott
BY Munn & Co
ATTORNEYS.

UNITED STATES PATENT OFFICE.

HARRISON C. LOTT, OF LEXINGTON, ILLINOIS.

GRAIN-SEPARATOR.

SPECIFICATION forming part of Letters Patent No. 267,549, dated November 14, 1882.

Application filed June 8, 1882. (No model.)

*To all whom it may concern:*

Be it known that I, HARRISON C. LOTT, of Lexington, in the county of McLean and State of Illinois, have invented a new and useful Improvement in Grain-Separators, of which the following is a full, clear, and exact description.

Reference is to be had to the accompanying drawings, forming a part of this specification, in which the same letters of reference indicate the same or corresponding parts in all the figures.

Figure 1 is a longitudinal sectional elevation of my improvement. Fig. 2 is a side elevation of the same. Fig. 3 is a sectional end elevation of a part of the same.

The object of this invention is to facilitate the separation of grain from straw and chaff.

A represents the frame of the separator, and B is the casing.

C is the platform, upon which the feeder stands, and D is the feed-apron, from which the grain to be thrashed passes to the thrashing-cylinder E.

F is the beater, by which the grain is knocked out of the straw, and from which the straw and grain pass to the straw-shaker G. The straw-shaker G is provided with projections H or forked arms, by which the straw is carried back, and from the outer end of which the straw passes to the staw-carrier. The grain falls through the straw-shaker G to the separating-table I, rigidly connected with the said straw-shaker. From the separating-table I the grain falls to the shoe J, where the chaff is blown out by a blast of air from the fan-blower K, and the cleaned grain falls into the spout L and is carried out of the machine by the feed-screw M. The tailings are taken up by the elevator N and discharged through the spout O upon the feed-apron D, to again pass through the machine.

The machine is designed to be driven by power applied to the thrashing-cylinder E by a belt and pulley or side gear in the ordinary manner, which driving mechanism is not shown in the drawings.

To a journal of the thrashing-cylinder E is attached a pulley, P, around which passes a belt, Q. The belt Q passes from the pulley P to and around a large pulley, R, attached to a journal of a crank-shaft, S, which revolves in bearings attached to the frame A, and the cranks of which are connected with the forward part of the separating-table I, or with bars or a frame, T, rigidly connected with the separating table I and straw-shaker G. With the rear end of the separating-table I or the bars or frame T is connected the cranks of the crank-shaft U, which works in bearings attached to the frame A. The shafts S U are made with double cranks, and the cranks upon their lower sides are connected with the shoe J by studs V, or other suitable means, so that the straw-shaker and separating-table and the shoe will be vibrated by the same crank-shafts, but in opposite directions. From the pulley R the belt Q passes around a guide-pulley, W, to keep the said belt longer in contact with the pulley R, and passes thence to and around the guide-pulley X and around the pulley Y of the fan-blower K. From the pulley Y the belt Q passes to and around the guide-pulley Z and around the pulley *a* of the feed-screw M. From the pulley *a* the belt Q passes over and around the pulley *b*, attached to the lower roller, *c*, of the straw-carrier *d*, and passes thence to and around the pulley *e*, that drives the elevator N, to and around the pulley *f*, that drives the beater F, and thence to the pulley P of the thrashing-cylinder E, so that all the other operating parts of the separator will be driven from the thrashing-cylinder E by a single belt.

Having thus described my invention, I claim as new and desire to secure by Letters Patent—

1. A grain-separator constructed substantially as herein shown and described, and consisting of the thrashing-cylinder E, the straw-shaker G, and separating-table I, the crank-shafts S U, the shoe J, the fan-blower K, and the driving pulleys and belt, as set forth.

2. In a grain-separator, the combination, with the straw-shaker G and separating-table I and the crank-shafts S U, of the shoe J and mechanism, substantially as herein shown and described, for operating the straw-shaker, shoe, and separating-table, whereby the said shoe will be vibrated at the same time as the straw-shaker and separating-table, by the same mechanism and in the opposite direction, as set forth.

HARRISON C. LOTT.

Witnesses:
GEORGE R. LOTT,
JOSEPH H. MCDANIEL.